United States Patent Office 3,489,733
Patented Jan. 13, 1970

3,489,733
BINARY COPOLYMERS OF ETHYLENE AND AN OMEGA-ALKENYL-POLYCYCLOALKENE AND TERNARY COPOLYMERS OF ETHYLENE, AN OMEGA-ALKENYL-POLYCYCLOALKENE, AND AN ALIPHATIC MONOOLEFIN
Giulio Natta, Alberto Valvassori, Guido Sartori, and Nazareno Cameli, Milan, Italy, assignors to Montecatini Edison S.p.A., Milan, Italy
No Drawing. Continuation of application Ser. No. 300,935, Aug. 8, 1963. This application July 12, 1967, Ser. No. 652,983
Claims priority, application Italy, Aug. 9, 1962, 16,057/62
Int. Cl. C08f 19/00
U.S. Cl. 260—80.78                    15 Claims

ABSTRACT OF THE DISCLOSURE

Substantially linear, amorphous and unsaturated copolymers of ethylene, or of ethylene and higher alpha-olefins, with at least one omega-alkenylpolycycloalkene, are disclosed. Also disclosed is a method of obtaining the copolymers by copolymerizing a mixture of the monomers in contact with a halogen-containing catalyst prepared from vanadium compounds and organo-metallic compounds or hydrides of aluminum or of beryllium.

This application is a continuation of our application Ser. No. 300,935 filed Aug. 8, 1963, now abandoned.

Italian Patents 566,913 and 638,953 and Belgian Patents 623,698 and 623,741 describe the preparation of amorphous, unsaturated, vulcanizable copolymers by the copolymerization of ethylene and/or aliphatic alpha-olefins with hydrocarbon dienes or polyenes. More particularly they describe the preparation of vulcanizable amorphous copolymers of ethylene and/or higher alpha-olefins with conjugated, non-conjugated linear or cyclic dienes.

It has now been found, according to the present invention, that by using particular catalysts of the anionic co-ordinated type, it is possible to prepare a new class, heretofore never described in the literature, of amorphous unsaturated copolymers, capable of giving through vulcanization, elastomers having good mechanical characteristics. More particularly it has been found that by using catalysts prepared from vanadium compounds and metal-lorganic aluminum or beryllium compounds it is possible to obtain linear, high molecular weight, amorphous, unsaturated copolymers of one or more monomers selected from omega-alkenyl-polycycloalkenes with one or more monomers selected from ethylene and aliphatic alpha-olefins having the general formula R—CH═CH₂ in which R is an alkyl group containing 1 to 6 carbon atoms, which copolymers consist of macromolecules containing unsaturations and consist of monomeric units deriving from each of the monomers employed.

The possibility of preparing copolymers such as those described above, namely copolymers containing in their macromolecules units of one or more olefins and units of one or more ω-alkenyl-polycycloalkenes (which are dienes containing a terminal unsaturation of vinyl type in an aliphatic chain and an unsaturation in a polycyclic system) was by no means obvious and predictable. Due to the high reactivity of the double bond in certain polycyclic systems, it is not unusual to expect that both the double bonds of the same diene molecule would partake in the polymerization thus giving tridimensional polymers, insoluble in organic solvents and of no practical value.

On the other hand, since ω-alkenyl-polycycloalkenes have a rather low homopolymerization rate, one could believe that their use in the preparation of copolymers with mono-olefinic monomers (ethylene and/or higher alpha-olefins) would involve a considerable reduction in the polymerization rate with respect to the polymerization rate of the mono-olefinic monomers alone.

It has, on the contrary, surprisingly been found that the formation of insoluble tridimensional polymers does not occur and that, therefore, only one of the two unsaturations of the diene partakes of the polymerization while the other one remains available for successive reactions, such as e.g., vulcanization.

Moreover, it has been found that, contrary to what could be expected, ω-alkenyl-polycycloalkenes co-polymerize with great ease and show a very high reactivity. This fact makes it possible to use them in the reaction mixture in very low proportions with respect to the total volume of the reaction mix.

As non-limitative examples of ω-alkenyl-polycycloalkenes which can be used in the copolymerization process according to the present invention we mention:

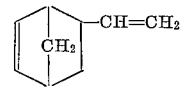

2-vinyl-bicyclo (2,2,1) heptene-5

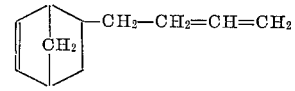

2-buten-3′-yl-bicyclo (2,2,1)-heptene-5

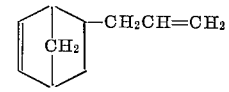

2-allyl-bicyclo (2,2,1)-heptene-5

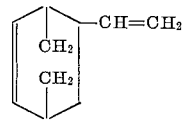

2-vinyl-bicyclo (2,2,2) octene-5

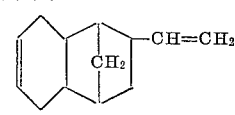

2-vinyl-1,4-endomethylen-1,2,3,4,5,5a,8,8a-octahydronaphthalene

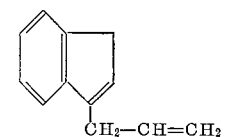

3-allylindene

Most of these monomers can be easily obtained by means of Diels-Alder condensation reactions.

For instance, 2-vinyl-bicyclo (2,2,1)heptene-5 can be obtained by the condensation of 1 mole of cyclopentadiene and 1 mole of butadiene-1,3; 2-buten-3′-yl-bicyclo (2,2,1)-heptene-5 can be obtained by the condensation of cyclopentadiene and diallyl.

The olefins which can be used, if desired, with ethylene, in the preparation of copolymers with omega-alkenyl-polycycloalkenes are aliphatic alpha-olefins having the general formula R—CH═CH₂ in which R is an alkyl group containing 1 to 6 carbon atoms, more particularly propylene and butene-1.

By copolymerizing, according to the present invention, a mixture of the said monomers, such as e.g. a mixture of ethylene, propylene and/or butene-1 and 2-vinyl-bicyclo (2,2,1)-heptene-5, a crude copolymerization product is obtained, which consists of macromolecules each containing monomeric units, distributed at random, of ethylene, propylene and/or butene-1 and vinyl-bicycloheptene. Each of the monomeric units derived from the polymerization of the ω-alkenyl-polycycloalkene still contains a free unsaturation.

The infrared spectrographic examination of the copolymers of ω-alkenyl-polycycloalkene with ethylene, and the examination of ω-alkenylpolycycloalkene homopolymers obtained under conditions similar to those used in the copolymerization show that these dienes or polyenes under the conditions of the process according to the present invention, illustrated hereinbelow, polymerized prevailingly through the alkenyl double bonds. The inner unsaturations present in the polycyclic system are not considerably involved in the polymerization process. This fact differentiates the polymerization mechanism of this invention from those already described. In the case of the polymerization of unsaturated endomethylenic hydrocarbons e.g. it is caused by the opening of a C—C bond placed near the double bond of a ring or otherwise the opening of the double bond itself.

The unsaturations which, as has been pointed out, are present in the copolymers of this invention, are reactive points for successive reactions to which the copolymer can be subjected. These unsaturations, e.g., make it possible to vulcanize the copolymers by employing mixes of the type commonly used for unsaturated rubbers.

The double bonds present in the macromolecules, e.g., after oxidation with ozone, can also allow the formation of polar groups such as e.g., carboxylic groups, which in turn can be used as reactive groups for successive reactions (e.g., the vulcanization with polyvalent basic substances) and can also be utilized for improving the adhesion of the polymers.

The copolymers of the present invention can be defined as copolymers having a linear structure, namely as substantially free of long branches. This is demonstrated by the fact that they have properties (such as, more particularly, a viscous behavior) practically identical with those of known linear copolymers, e.g., of a linear ethylene/alphaolefin copolymer.

The new copolymers described here have a molecular weight, determined viscosimetrically, higher than 20,000, corresponding to an intrinsic viscosity, determined in toluene at 30° C. or in tetrahydronaphthalene at 135° C., higher than 0.5. The intrinsic viscosity of the copolymers may range from 0.5 to 10 or higher values. For most practical purposes copolymers having an intrinsic viscosity of from 1 to 5 are preferred.

The composition of the copolymers can be defined as homogeneous, as it is demonstrated by the ease of obtaining e.g., in the case of an ethylene:propylene:2-vinyl-bicyclo-(2,2,1)heptene-5 terpolymer, good vulcanized product by adopting the mixes utilized in the vulcanization of unsaturated rubbers, preferably of those having a low unsaturation content, such as butyl rubber. This also shows that the unsaturations are well distributed along the chain.

The thus obtained vulcanized products, as distinguished from the not vulcanized polymers which are completely soluble in boiling n-heptane, are wholly insoluble in the organic solvents and are capable of swelling only to a restricted extent in some organic solvents, for instance aromatic hydrocarbons.

Moreover, the vulcanized rubbers so obtained show very good mechanical strength and very low residual deformations at break. Petroleum oils can be used as extenders or plasticizers in these vulcanizations. Paraffinic and naphthenic oils are preferred; however, aromatic oils can also be used.

The catalytic systems which may be employed in the process which is an object of this invention are very dispersed, or amorphous colloidally dispersed, or wholly dissolved in the hydrocarbons which may be employed as the copolymerization medium. For instance, hydrocarbons which may be employed as the copolymerization medium may be aliphatic, cycloaliphatic, or aromatic hydrocarbons. The catalytic systems which may be employed in the process are prepared from organo-metallic or hydride aluminum or beryllium compounds and vanadium compounds.

The metallorganic or hydride compounds which may be employed in the catalysts preparation are preferably selected from the group consisting of beryllium dialkyls, beryllium alkylhalides, beryllium diaryls, aluminum trialkyls, aluminum dialkylmonohalides, aluminum monoalkyldihalides, aluminum alkylsesquihalides, aluminum alkenyls, aluminum alkylenes, aluminum cycloalkyls, aluminum cycloalkylalkyls, aluminum aryls, aluminum alkylaryls, or complexes of the above cited organo-aluminum compounds with preferably weak Lewis bases, aluminum alkylhydrides, aluminum halohydrides. Metallorganic compounds can also be employed in which the metal is bound with main valences not only to carbon and/or halogen atoms but also to oxygen atoms bound to an organic group, such as e.g., aluminum dialkyl alkoxides and aluminum alkylalkoxy halides.

We mention the following compounds, as non-restrictive examples of metallorganic compounds or hydrides that can be employed: beryllium dimethyl, beryllium methylchloride, beryllium diethyl, aluminum triethyl, aluminum tri-isobutyl, aluminum trihexyl, aluminum diethylmonochloride, aluminum diethylmonoiodide, aluminum diethylmonofluoride, aluminum di-isobutylmonochloride, aluminum monoethyldichloride, aluminum ethylsesquichloride, aluminum butenyldiethyl, aluminum isohexenyldiethyl, 2-methyl - 1,4 - di(diisobutyl-aluminum)-butane, aluminum tri-(cyclopentyl-methyl), aluminum tri(dimethylcyclopentylmethyl), aluminum triphenyl, aluminum tritolyl, aluminum di(cyclopentylmethyl) monochloride, aluminum diphenyl monochloride, aluminum di-isobutylmonochloride complexed with anisole, aluminum monochloromonoethylmonoethoxide, aluminum diethyl propoxide, aluminum diethylamyloxide, aluminum monochloromonopropyl monopropoxide, aluminum monochloromonopropyl monoethoxide, aluminum diethylmonohydride, aluminum diisobutylmonohydride, aluminum monoethyldihydride, aluminum chlorohydride.

Preferably employed in the catalyst preparation are such vanadium compounds which are soluble in the hydrocarbons that may be utilized as the copolymerization medium. The vanadium compounds soluble in hydrocarbons which may be employed in the catalyst preparation are halides and oxyhalides (as e.g., $VOCl_3$, $VCl_4$, $VBr_4$) and such compounds wherein at least one of the metal valences is saturated by a hetero-atom (in particular oxygen or nitrogen linked to an organic group) as for instance: vanadium triacetylacetonate, vanadium tribenzoylacetonate, vanadyl diacetylacetonate, vanadyl, haloacetylacetonates, vanadyl trialkoxides, vanadyl haloalkoxides; the tetrahydrofuranates, the etherates, the aminates, pyridinates and quinolinates of vanadium tri- and tetrachloride and of vanadyl trichloride. One may also use hydrocarbon-insoluble vanadium compounds selected from the organic salts such as e.g., vanadium triacetate, tribenzoate and tristearate. In practice it has been found that in order to obtain the best results it is necessary to operate in the presence of a halogen-containing catalyst system obtained from vanadium compounds and aluminum or beryllium organic or hydride compounds wherein at least one of the valences of vanadium and/or of the valences of aluminum or beryllium is saturated by a halogen atom.

Thus, all the above mentioned organo-aluminum or beryllium compounds or hydrides may be employed in the catalyst preparation with halogen-containing vanadium compounds. However, it is necessary to use halogen-containing metallorganic or hydride compounds in the catalyst preparation with halogen-free vanadium compounds.

The copolymerization process of the present invention may be carried out at temperatures in the range between −80° and 125° C. When catalysts are employed which are prepared from vanadium triacetylacetonate, vanadyl diacetylacetonate, vanadyl haloacetylacetonates, or in general from a vanadium compound in the presence of aluminum alkylhalides, it is convenient to carry out both the catalyst preparation and the copolymerization at temperatures in the range between 0° C. and −80° C., and preferably between −10° and −50° C., in order to obtain high copolymer productions per weight unit of employed catalysts. When operating under said conditions, the catalysts display an activity much higher than that of the same catalytic systems prepared at higher temperatures. Moreover, when operating within the above indicated range of low temperatures, the activity of the catalysts remains practically unaltered over long periods of time.

When catalysts are employed which are prepared from vanadium triacetylacetonate, vanadyl trialkoxides, or vanadyl haloalkoxides and an aluminum alkylhalide at temperatures in the range between 0° C. and 125° C., it is advantageous to operate in the presence of particular complexing agents selected from ethers, thioethers, tertiary amines or trisubstituted phosphines containing at least one branched alkyl group or an aromatic nucleus in order to obtain high copolymer outputs.

The complexing agent may be an ether of the formula RYR′, wherein Y is oxygen or sulphur and R and R′ represent a linear or branched alkyl group containing from 1 to 14 carbon atoms or an aromatic nucleus containing from 6 to 14 carbon atoms, at least one of the R and R′ being a branched alkyl group or an aromatic nucleus.

The complexing agent may also be a tertiary amine of the formula

wherein R, R′ and R″ represent an alkyl group containing from 1 to 14 carbon atoms or an aromatic nucleus containing from 6 to 14 carbon atoms at least one of the R, R′ and R″ being an aromatic nucleus. The complexing agent may also be a tertiary phosphine of the formula

wherein R, R′ and R″ represent an alkyl group containing from 1 to 14 carbon atoms or an aromatic nucleus containing from 6 to 14 carbon atoms at least one of the R, R′ and R″ being an aromatic nucleus.

The amount of complexing agent is preferably comprised between 0.05 and 1 mole per mole of aluminum alkylhalide.

The activity of the catalysts employed in the herein described process varies according to the molar ratio between the compounds employed in the catalyst preparation.

According to the present invention it has been found that if aluminum trialkyls and vanadium halides or oxyhalides are utilized, it is preferable to employ catalysts in which the molar ratio of aluminum trialkyl to vanadium compound is comprised between 1:1 and 5:1 and more preferably between 2:1 and 4:1.

If, however, aluminum diethylmonochloride

and vanadium triacetylacetonate (VAc$_3$) are employed, the best results are obtained with an Al(C$_2$H$_5$)$_2$Cl/VAc$_3$ molar ratio comprised between 2:1 and 20:1 and more preferably between 4:1 and 10:1.

The copolymerization which is an object of this invention may be carried out in the presence of an aliphatic, cyclo-aliphatic or aromatic hydrocarbon solvent such as e.g., butane, pentane, n-heptane, toluene, xylene or mixtures thereof. Halogenated hydrocarbon such as e.g., chloroform, trichloroethylene, tetrachloroethylene, chlorbenzene, methylene chloride, etc., can also be used as solvents.

Particularly high copolymer outputs may be obtained if the copolymerization is carried out in the absence of an inert solvent, by employing the monomers themselves in the liquid state. An embodiment of this is the copolymerization carried out in the presence of an ethylene solution with the mixtures of alpha-olefins and of ω-alkenyl polycycloalkene to be copolymerized, kept in the liquid state.

In order to obtain copolymers having a high composition homogeneity, the ratio between concentrations of the monomers to be copolymerized, present in the liquid reacting phase, should conveniently be kept constant or at least as constant as possible during the copolymerization. To this end it may be convenient to carry out the copolymerization continuously, by feeding and discharging in a continuous manner a mixture of monomers of constant composition and by operating at high spatial velocities.

The compositions of the copolymers may be varied within wide limits by varying the composition of the monomers in the mixture. In case of copolymers of ethylene with an ω-alkenyl-polycycloalkene, such as e.g., 2-vinyl-bicyclo (2,2,1) heptene-5, it is necessary to regulate the monomer mixture so as to obtain copolymers having a relatively high diene or polyene content, preferably higher than 20%–25% by mols, in order to obtain amorphous materials having elastomeric properties. If one wants to obtain amorphous copolymers of an omega-alkenyl-polycycloalkene with ethylene and propylene it will be profitable to keep a liquid reactant phase molar ratio lower than or at most equal to 1:4 between ethylene and propylene. This corresponds to an ethylene-propylene molar ratio lower than, or at most equal to 1:1 in the gaseous phase, under normal conditions, with molar ratios of between 1:200 and 1:4 in the liquid phase being satisfactory. When butene-1 is employed instead of propylene the ratio between ethylene and butene must be lower than or at most equal to 1:20. The composition of the corresponding gaseous phase, under normal conditions, is lower than or at most equal to 1:1.5. Molar ratios of from 1:1000 and 1:20 in the liquid phase are usually preferred.

By operating under these conditions amorphous terpolymers containing less than about 75% by mols of ethylene are obtained. If the terpolymers contain more than about 75% by mols of ethylene they show a polyethylene type crystallinity. The lower ethylene content is not critical, it is however preferred that the terpolymers contain at least 5% by mols of ethylene. The α-olefin content may preferably vary from 5% up to 95% by mols. The diene or polyene content in the terpolymer is preferably comprised between 0.1 and 20% by mols. This limit can however be raised but, especially for economical reasons, it is not convenient to introduce into the terpolymer a diene or polyene content of more than 20% by mols.

The copolymers which are an object of this invention show, as such, the properties of unvulcanized elastomers, in the sense that they exhibit low initial elastic moduli and very high ultimate elongations. The presence of unsaturated bonds in the macromolecules allows them to be vulcanized with the methods normally employed for the unsaturated rubbers, and more particularly for the unsaturated rubbers with a low content of unsaturated bonds.

The vulcanized products show high reversible elastic elongations and, particularly when reinforcing fillers such as carbon black are employed in the vulcanization mix, they show also high tensile strengths.

The elastomers obtained through vulcanization of the copolymers according to the present invention can be advantageously used, due to their high mechanical characteristics, in the preparation of various articles, such as shaped articles, pipes, tire tubes, elastic yarns, etc.

EXAMPLE 1

The reaction apparatus is made up of a glass cylinder having a diameter of 5.5 cm. and a capacity of 750 cc., provided with stirrer and inlet and outlet pipes for the gases, immersed in a thermostatic bath at −20° C. The gas inlet pipe reaches the cylinder bottom and ends with a porous diaphragm (diameter 3.5 cm.), 200 ml. anhydrous n-heptene and 1 ml. of radioactive 2-vinyl bicyclo (2,2,1)-heptene-5 are introduced into the reactor kept under nitrogen atomsphere. Agitation is started and from the gas inlet pipe a gaseous propylene-ethylene mixture in the molar ratio 2:1 is introduced and circulated with a space velocity of 200 nl./h. The catalyst is previously formed in a 100-ml. flask kept at −20° C. by reacting 1.4 millimols of vanadium triacetylacetonate and 7 millimols of aluminum diethylmonochloride in 30 cc. of anhydrous toluene. The catalyst thus formed is siphoned into the reactor by means of nitrogen pressure. Feeding and discharging of the propylene-ethylene mixture is carried out at space velocity of 400 nl./h. After 35 minutes from the beginning of the reaction, it is stopped by adding 20 cc. of methanol containing 0.1 g. of phenyl-$\beta$-naphthyl amine. The product is purified in a separatory funnel under nitrogen by repeated treatments with diluted hydrochloric acid and then with water, and is coagulated with acetone. After drying under vacuum 15.5 g. of a solid product is obtained, which appears to be amorphous by X-rays examination, looks like an unvulcanized elastomer and is completely soluble in boiling n-heptane.

The radiochemical analysis shows the presence of vinyl bicycloheptene. The infrared spectrographic examination shows that the ethylene-propylene molar ratio is about 1:1 and that a few vinyl groups are present. The intrinsic viscosity, determined in toluene at 30° C., is 2.5.

100 parts by weight of the ethylene-propylene-vinyl bicycloheptene copolymer are mixed, on a laboratory roll mixer, with 1 part of phenyl-$\beta$-naphthylamine, 2 parts of sulphur, 5 parts of zinc oxide, 1 part of tetra-methylthiuram disulphide and 0.5 part of mercaptobenzothiazole.

The mixture thus obtained is vulcanized in a press for 60 minutes at 150° C. A vulcanized sheet having the following characteristics is obtained:

Tensile strength _____kg./cm.$^2$__ 30
Elongation at break _____percent__ 380
Modulus at 300% _____kg./cm.$^2$__ 15.5
Permanent set at break _____percent__ 4

EXAMPLE 2

The reaction apparatus is similar to that described in Example 1, but has a capacity of 1000 cc. and a diameter of 5.5 cm.

Into this apparatus kept at −20° C., are introduced 700 cc. of anhydrous n-heptane and 1.5 cm.$^3$ of radioactive 2-vinyl-bicyclo(2,2,1)heptene-5. Agitation is started and through the gas inlet tube, a gaseous propylene-ethylene mixture having a molar ratio of 2:1 is introduced and circulated at the rate of 200 nl./h.

Into a 100 cm.$^3$ flask, kept under nitrogen, the catalyst is preformed at −20° C., by reacting, in 30 cm.$^3$ of anhydrous n-heptane, 1 millimole of vanadium tetrachloride and 5 millimols of aluminum diethyl monochloride. This pre-formed catalyst is sent into the reactor through a siphon by means of nitrogen pressure. The propylene-ethylene mixture is continuously fed and discharged at the spatial rate of 400 nl./h. 6 minutes after starting, the reaction is stopped by adding 10 cm.$^3$ of methanol containing 0.1 g. of phenyl-$\beta$-naphtyl amine. The copolymer is purified and isolated as described in Example 1. After vacuum drying, 24 g. of solid product which is amorphous at the X-rays examination, looks like a non-vulcanized elastomer and is completely soluble in boiling n-heptane is obtained.

The radiochemical analysis shows the presence of vinyl bicycloheptene. The infrared spectrographic examination shows that the ethylene/propylene molar ratio is about 1:1 and that very few vinyl groups are present. The intrinsic viscosity is 2.3.

The ethylene-propylene-vinyl bicycloheptene copolymer is vulcanized with the same mix and conditions of Example 1. A vulcanized sheet showing the following characteristics is obtained:

Tensile strength _____kg./cm.$^2$__ 47.6
Elongation at break _____percent__ 380
Modulus at 300% _____kg./cm.$^2$__ 15
Permanent set at break _____percent__ 4

If, in addition to the ingredients mentioned in Example 1, 50 parts by weight of carbon black HAF (high abrasion furnace) are added and the vulcanization is carried out under the conditions of Example 1, a vulcanized sheet is obtained, having the following characteristics:

Tensile strength _____kg./cm.$^2$__ 255
Elongation at break _____percent__ 360
Modulus at 300% _____kg./cm.$^2$__ 196
Permanent set at break _____percent__ 8

EXAMPLE 3

Into the same reaction apparatus as described in Example 1, kept at −20° C., are introduced 200 cm.$^2$ of anhydrous n-heptane and 1 cm.$^3$ radioactive 2-vinyl bicyclo(2,2,1)heptene-5. Agitation is started and through the gas inlet tube a gaseous propylene-ethylene mixture, in the molar ratio of 2:1, is introduced and circulated at the flowrate of 200 nl./h. Into a 100 cm.$^3$ flask the catalyst is pre-formed at −20° C. under nitrogen by reacting, in 30 cm.$^3$ of anhydrous n-heptane, 1 millimole of vanadium tetrachloride and 2.5 millimols of aluminum trihexyl. This pre-formed catalyst is siphoned into the reactor by means of nitrogen pressure. The propylene-ethylene mixture is continuously fed and discharged at the flow-rate of 400 nl./h. 4 minutes after starting the reaction it is stopped by adding 20 cm.$^3$ of methanol containing 0.1 g. of phenyl-$\beta$-naphthylamine.

The product is purified and isolated as described in Example 1. After vacuum drying, 5.4 g. of solid product which is amorphous under X-ray examination, looks like a non-vulcanized elastomer and is completely soluble in boiling n-heptane is obtained. The radiochemical analysis shows the presence of vinylbicyclohepene. The infrared spectrographic examination shows that the ethylene-propylene molar ratio is about 1:1 and that very few vinyl groups are present.

100 parts by weight of ethylene-propylene-vinylcycloheptene copolymer are mixed in a laboratory roll mixer with a mix consisting of 0.5 part of Antiox 2246 (2,2-methylene-bis-4-methyl-6-tert. butylphenol), 2 parts of sulphur, 5 parts of zinc oxide, 0.5 part of mercaptobenzothiazole and 1 part of tetramethylthiuram disulphide.

The mix is vulcanized in a press at 150° C. for 50 minute.

A vulcanized sheet is obtained, having the following characteristics:

Tensile strength _____kg./cm.$^2$__ 65
Elongation at break _____percent__ 500
Modulus at 300% _____kg./cm.$^2$__ 16

EXAMPLE 4

Into the same apparatus as described in Example 2, kept at −20° C., are introduced 700 cm.$^3$ of anhydrous n-heptane and 0.7 cm.$^3$ of radioactive 2-buten-3'-yl-bicyclo(2,2,1)heptene-5. Agitation is started and through the gas inlet tube, a gaseous propylene-ethylene mixture, having a molar ratio of 4:1, is introduced and circulated at the flow rate of 200 nl./h. In a 100 cm.$^3$ flask, the catalyst is pre-formed, at —20° C. under nitrogen atmosphere, by reacting, in 30 cm.$^3$ of anhydrous toluene, 7 millimols of aluminum diethyl monochloride and 1.4 millimols of vanadium triacetylacetonate. The catalyst thus pre-formed is kept at —20° C. for 5 minutes and is then siphoned into the reactor by means of nitrogen pressure. The gaseous propylene-ethylene mixture is continuously fed and discharged at a velocity of 400 nl./h.

1 hour after starting, the reaction is stopped by adding 20 cm.$^3$ of methanol containing 0.1 g. of phenyl-$\beta$-naphthylamine. The product is purified and isolated as described in Example 1. After vacuum drying, 15 g. of solid product which is amorphous at the X-ray examination, looks like a non-vulcanized elastomer and is completely soluble in boiling n-heptane, is obtained. The radiochemical analysis shows the presence of butenyl bicycloheptene. The infrared spectrographic examination shows that the ethylene-propylene molar ratio is about 1:1 and that very few vinyl groups are present. The ethylene-propylene-butenyl bicycloheptene copolymer is vulcanized with the same mixture and conditions as in Example 1. A vulcanized sheet is obtained, having the following characteristics:

| | |
|---|---|
| Tensile strength kg./cm.$^2$ | 52 |
| Elongation at break percent | 440 |
| Modulus at 300% kg./cm.$^2$ | 14 |
| Permanent set at break percent | 4 |

EXAMPLE 5

Into the reaction apparatus described in Example 1, kept at —20° C., are introduced 350 cm.$^3$ of anhydrous n-heptane and 0.3 cm.$^3$ of radioactive 2-buten-3'-yl-bicyclo(2,2,1)-heptene-5. Agitation is started and through the gas inlet tube a gaseous propylene-ethylene mixture in the molar ratio of 2:1 is introduced and circulated at the flow-rate of 200 nl./h.

In a 100 cm.$^3$ flask the catalyst is pre-formed by operating at —20° C. under nitrogen atmosphere and by reacting 0.2 millimol of vanadium tetrachloride and 2 millimols of aluminum diethylmonochloride in 30 cm.$^3$ of anhydrous n-heptane. The catalyst so prepared is siphoned into the reactor by means of nitrogen pressure. The ethylene-propylene mixture is continuously fed and discharged at a rate of 400 nl./h. After 90 seconds the reaction is stopped by addition of 10 cm.$^3$ of methanol containing 0.1 g. phenyl-$\beta$-naphthylamine.

The product is purified and isolated as described in Example 1.

After vacuum drying, 3.2 g. of solid product which is amorphous under X-ray examination, is completely soluble in boiling n-heptane and looks like a non-vulcanized elastomer is obtained. The intrinsic viscosity is 2.5. The radiochemical analysis shows the presence of butenyl bicycloheptene. Infrared spectrographic examination shows that very few vinyl groups are present and that the ethylene/propylene molar ratio is about 1:1.

It is vulcanized by adopting the mix and the modalities of Example 1.

A vulcanized sheet having the following characteristics is obtained:

| | |
|---|---|
| Tensile strength kg./cm.$^2$ | 40 |
| Elongation at break percent | 390 |
| Modulus at 300% kg./cm.$^2$ | 15 |
| Permanent set at break percent | 6 |

EXAMPLE 6

Into the same reaction apparatus described in Example 1, kept at +25° C., are introduced 350 cm.$^3$ of anhydrous n-heptane and 2 cm.$^3$ of radioactive 2-buten-3'-yl-bicyclo(2,2,1)heptene-5. Agitation is started and through the gas inlet tube a gaseous propylene/ethylene mixture in the molar ratio of 2:1 is introduced and circulated at a rate of 200 nl./h.

In a 100 cm.$^3$ flask the catalyst is pre-formed at +25° C. under nitrogen atmosphere by reacting 1 millimole of vanadium tetrachloride and 2.4 millimoles of aluminum trihexyl in 30 cm.$^3$ of anhydrous n-heptane. The catalyst thus obtained is sent into the reactor through a nitrogen pressure.

The gaseous ethylene-propylene mixture is continuously fed and discharged at a rate of about 400 nl./h. After 10 minutes from starting, the reaction is stopped by the addition of 10 cm.$^3$ of methanol containing 0.1 g. phenyl-$\beta$-naphthylamine. The product is purified and separated as described in Example 1. After vacuum drying 4.5 g. of solid product, which is amorphous at the X-ray examination, is completely soluble in boiling n-heptane and looks like a non-vulcanized elastomer is obtained.

The radiochemical analysis shows the presence of butenyl bicycloheptene. The infrared spectrographic examination shows that the ethylene propylene molar ratio is about 1:1 and that very few vinyl groups are present. The ethylene-propylene-butenyl bicycloheptene copolymer is vulcanized by using the mix and the modalities of Example 1.

A vulcanized sheet having the following characteristics is obtained:

| | |
|---|---|
| Tensile strength kg./cm.$^2$ | 60 |
| Elongation at break percent | 520 |
| Modulus at 300% kg./cm.$^2$ | 14 |

EXAMPLE 7

200 cm.$^3$ of anhydrous n-heptane and 1 cm.$^3$ of radioactive 2-buten-3'-yl-bicyclo(2,2,1)heptene-5 are introduced into the reaction apparatus described in Example 1 kept at —20° C. Agitation is started and through the gas inlet tube a gaseous propylene-ethylene mixture in the molar ratio of 2:1 is introduced and circulated at the flow-rate of 200 nl./h.

In a 100 cm.$^3$ flask the catalyst is pre-formed at —20° C. under nitrogen by reacting 1 millimol of vanadium tetrachloride and 2.4 millimols of aluminum trihexyl in 30 cm.$^3$ of anhydrous n-heptane. The catalyst thus prepared is siphoned into the reactor by means of nitrogen pressure. The ethylene-propylene gaseous mixture is continuously fed and discharged at the flow-rate of 400 nl./h. After 2 minutes from the beginning of the reaction, it is stopped by adding 10 cm.$^3$ of methanol containing 0.1 g. of phenyl-$\beta$-naphthylamine.

The product is purified and isolated as described in Example 1. After vacuum drying 9 g. of a solid product which is amorphous under X-ray examination, is completely soluble in boiling n-heptane and looks like a non-vulcanized elastomer is obtained. The intrinsic viscosity is 1.9. The radiochemical analysis reveals the presence of butenylbicycloheptene. The infrared spectrographic analysis shows the presence of very few vinyl groups, and the ethylene-propylene molar ratio is about 1:1.

The ethylene-propylene-butenylbicycloheptene copolymer is vulcanized with the mix and the modalities of Example 1. A vulcanized sheet having the following characteristics is thus obtained:

| | |
|---|---|
| Tensile strength kg./cm.$^2$ | 31.4 |
| Elongation at break percent | 540 |
| Modulus at 300% kg./cm.$^2$ | 13 |

EXAMPLE 8

200 cm.$^3$ of anhydrous n-heptane and 1 cm.$^3$ of radioactive 2-vinyl-bicyclo(2,2,1)heptene-5 are introduced into the reaction apparatus described in Example 1, kept at 25° C. Agitation is started and through the gas inlet tube a propylene/ethylene gaseous mixture in the molar ratio of 2:1 is introduced and circulated at the flow-rate of 200 nl./h.

In a 100 cm.³ flask, kept at 25° C., the catalyst is pre-formed under nitrogen by reacting 1 millimol of vanadium tetrachloride and 5 millimols of aluminum diethyl monochloride in 30 cc. of anhydrous n-heptane. The catalyst thus pre-formed is siphoned into the reactor by means of nitrogen pressure.

The gaseous mixture is continuously fed and discharged at the flow-rate of 400 nl./h. After 7 minutes from the beginning the reaction is stopped by adding 10 cm.³ of methanol containing 0.1 g. of phenyl-β-naphthyl amine.

The product is purified and isolated as described in Example 1. After vacuum drying 3.5 g. of a solid product which is amorphorus under X-ray examination is completely soluble in boiling n-heptane and looks like a non-vulcanized elastomer, is obtained.

The radiochemical analysis shows the presence of vinyl bicycloheptene. The infrared spectrographic analysis shows the presence of very few vinyl groups, and the ethylene/propylene molar ratio is about 1:1.

The copolymer is vulcanized with the mix and modalities of Example 1. A vulcanized sheet having the following characteristics is thus obtained:

Tensile strength _____kg./cm.² __ 90
Elongation at break _____percent __ 460
Modulus at 300% _____kg./cm.² __ 27

EXAMPLE 9

200 cm.³ of anhydrous n-heptane and 3 cm.³ of 2-buten-3′-yl-bicyclo(2,2,1)heptene-5 are introduced into the reactor described in Example 1 kept at −20° C. Through the gas inlet tube a gaseous propylene-ethylene mixture in the molar ratio of 2:1 is introduced and circulated at the flow-rate of 200 nl./h.

In a 100 cm.³ flask the catalyst is pre-formed at −20° C. under nitrogen atmosphere by reacting 2 millimols of vanadium tetrachloride and 10 millimols of aluminum diethyl monochloride in 30 cm.³ of anhydrous n-heptane. The catalyst thus preformed is siphoned into the reactor by means of nitrogen pressure. The gaseous propylene-ethylene mixture is continuously fed and discharged at the flow-rate of 400 nl./h. After 15 minutes from the beginning, the reaction is stopped by adding 20 cm.³ of methanol containing 0.1 g. of phenyl-β-naphthyl amine. The product is purified in a separatory funnel under nitrogen by repeated treatments with diluted hydrochloric acid and then with water and is coagulated in acetone. After vacuum drying 9 g. of a solid product which is amorphous under X-ray examination, is completely soluble in boiling n-heptane and looks like a non-vulcanized elastomer is obtained. The infrared spectrographic examination shows the presence of unsaturations (band at 6 microns). The propylene/ethylene molar ratio is about 1:1.

100 parts by weight of the ethylene-propylene-butenyl-bicycloheptene copolymer are mixed in a laboratory roll mixer with 1 part of phenyl-β-naphthyl amine, 2 parts of sulphur, 5 parts of zinc oxide, 1 part of tetramethyl-thiuram disulphide and 0.5 parts of mercaptobenzothiazole. The mix obtained is vulcanized in a press as 150° C. for 30 minutes.

A vulcanized sheet having the following characteristics is thus obtained:

Tensile strength _____kg./cm.² __ 34
Elongation at break _____percent __ 480
Modulus at 300% _____kg./cm.² __ 13
Permanent set at break _____percent     6

If, in addition to the aforementioned ingredients, 50 parts by weight of carbon black HAF are also added and the vulcanization is carried out as described above a vulcanized sheet having the following characteristics is obtained:

Tensile strength _____kg./cm.² __ 320
Elongation at break _____percent __ 500
Modulus at 300% _____kg./cm.² __ 130
Permanent set at break _____percent __ 8

EXAMPLE 10

700 cm.³ of anhydrous n-heptane and 1.5 cm.³ of radioactive 2-allyl-bicyclo(2,2,1)heptene-5 are introduced into the reactor described in Example 2 kept at −10° C. Through the gas inlet tube a gaseous butene-1-ethylene mixture in the molar ratio 3:1 is introduced and circulated at the flow-rate of 200 nl./h.

In a 100 cm.³ flask the catalyst is pre-formed at −10° C. under nitrogen atmosphere by reacting 1 millimol of vanadium tetrachloride and 5 mollimols of aluminum diethylmonochloride in 30 cm.³ of anhydrous n-heptane. The catalyst thus pre-formed is siphoned into the reactor by means of nitrogen pressure.

The gaseous ethylene-butene mixture is continuously fed and discharged at the flow-rate of 400 nl./h. After 5 minutes from the beginning, the reaction is stopped by adding 10 cm.³ of methanol containing 0.1 g. of phenyl-β-naphthyl amine. The product is purified and isolated as described in Example 1.

After vacuum drying 24 g. of a solid product which is amorphous under X-ray examination, is completely soluble in boiling n-heptane and looks like a non-vulcanized elastomer is obtained. The radiochemical analysis shows the presence of about 2% by mols of allyl bicyclo heptene. The infrared analysis shows that the ethylene-butene molar ratio is about 1:1.

The terpolymer is vulcanized with the same mix and with the same procedure of Example 1. A vulcanized lamina having following characteristics is obtained:

Tensile strength _____kg./cm.² __ 38
Elongation at break _____percent __ 420
Modulus at 300% _____kg./cm.² __ 14

EXAMPLE 11

The reaction apparatus is similar to the one described in Example 1. It has however a volume of 1000 cc. and a diameter of 7.5 cm. 700 cc. of anhydrous n-heptane and 1.5 cc. of radioactive 2-vinyl-bicyclo(2,2,1)heptene-5 are introduced into this apparatus kept at −20° C. Agitation is started and through the gas inlet tube a gaseous propylene-ethylene mixture, having a molar ratio of 2:1 is introduced and circulated at the rate of 200 nl./h.

The catalyst is pre-formed in a 100 cc. flask at −20° C. under nitrogen atmosphere by reacting in 30 cc. of anhydrous heptane 1 millimole of vanadium tetrachloride and 5 millimols of aluminumdiethylmonohydride. The thus preformed catalyst is siphoned into the reactor by means of nitrogen pressure. The gaseous propylene-ethylene mixture is continuously circulated at a rate of 400 nl./h.

6 minutes after starting the reaction is stopped by adding 10 cc. of methanol containing 0.1 g. of phenyl-β-naphthylamine. The product is purified and isolated as described in Example 1.

After vacuum drying 24 g. of solid product which is amorphous at the X-rays, looks like a nonvulcanized elastomer and is completely soluble in boiling n-heptane are obtained.

The radiochemical analysis shows the presence of vinyl-bicycloheptane. The infrared spectrographic examination shows that the ethylene/propylene molar ratio is about 1:1 and that very few vinyl groups are present.

The ethylene-propylene-vinyl bicycloheptene copolymer is vulcanized with the same mixture and under the same conditions as in Example 1.

A vulcanized sheet is obtained, which has the following characteristics:

| | |
|---|---|
| Tensile strength | kg./cm.² 47.6 |
| Elongation at break | percent 380 |
| Modulus at 300% | kg./cm.² 15 |

What is claimed is:

1. High molecular weight substantially linear, armorphorus, unsaturated and sulfur-vulcanizable copolymers having a molecular weight in excess of 20,000, corresponding to an intrinsic viscosity, as determined in tetrahydronaphthalene at 135° C. or in toluene at 30° C. in excess of 0.5, of at least one omega-n-alkenylpolycycloalkene wherein the double bonds located in the omega position are of vinyl type with at least one monoolefin selected from the group consisting of ethylene and aliphatic olefins having the general formula R—CH=CH$_2$, wherein R is an alkyl group containing from 1 to 6 carbon atoms, said copolymers being made up substantially of copolymerized units of each of the starting monomers.

2. Copolymers according to claim 1, substantially consisting of macromolecules made up of copolymerized units of at least one monoolefin selected from the group consisting of ethylene and aliphatic olefins having the general formula R—CH=CH$_2$, wherein R is an alkyl group containing from 1 to 6 carbon atoms, and at least one omega-alkenylpolycycloalkene selected from the group consisting of 2-vinyl-bicyclo(2,2,1)heptene-5; 2-buten-3'yl - bicyclo(2,2,1)heptene - 5; 2 - allyl - bicyclo(2,2,1) heptene - 5; 2 - vinyl - bicyclo(2,2,1)octene - 5; 2 - vinyl-1,4 - endomethylene - 1,2,3,4,5,5a,8,8a - octahydronaphthalene, and 3-allyl-indene.

3. Copolymers according to claim 1, consisting of macromolecules each made up of copolymerized units of ethylene, propylene and 2-vinyl-bicyclo(2,2,1)heptene-5.

4. Copolymers according to claim 1, consisting of macromolecules each made up of copolymerized units of ethylene, propylene and 2-buten-3'yl-bicyclo(2,2,1)heptene-5.

5. Copolymers according to claim 1, consisting of macromolecules each made up of copolymerized units of ethylene, butene-1 and 2-allyl-bicyclo(2,2,1)heptene-5.

6. The copolymers of claim 1, sulfur-vulcanized to an elastomeric material.

7. A process for the preparation of the copolymers according to claim 1, characterized in that the mixture of monomers is polymerized in the presence of a catalyst consisting essentially of the reaction product obtained from:

(a) a vanadium compound selected from the group consisting of vanadium halides, vanadium oxyhalides, and vanadium compounds in which at least one of the valences is saturated by a hetero-atom selected from oxygen and nitrogen bound to an organic group, and (b) a compound selected from the group consisting of organometallic compounds of beryllium and organometallic compounds of aluminum, wherein at least one of the compounds (a) and (b) contains halogen atoms.

8. The process according to claim 7, characterized in that the copolymerization is carried out at temperatures in the range between —80° C. and +125° C.

9. The process according to claim 7 characterized in that the catalyst is obtained from a vanadium compound and an aluminum alkylhalide, and both the catalyst preparation and the copolymerization are carried out at temperatures in the range between 0° and —80° C.

10. The process according to claim 7 characterized in that the catalyst is obtained from an aluminum alkylhalide and a vanadium compound selected from the group consisting of vanadium triacetylacetonate, vanadyl trialkoxides, and vanadyl haloalkoxides, and the copolymerization is carried out at temperatures in the range between 0° and 125° C. in the presence of at least one complexing agent selected from the group consisting of ethers, thioethers, tertiary amines and trisubstituted phosphines, containing at least one group selected from branched alkyl and aromatic groups.

11. The process according to claim 7 characterized in that the copolymerization is carried out with the monomers in the liquid state and in the absence of extraneous inert solvent.

12. The process according to claim 7 characterized in that the polymerization is carried out in a solvent.

13. The process according to claim 7, wherein the monomers are an omega-alkenylpolycycloalkene, ethylene and propylene, and the molar ratio between propylene and ethylene in the reacting liquid phase is at least 4:1.

14. The process according to claim 7, wherein the monomers are an omega-alkenylpolycycloalkene, ethylene and butene-1, and the molar ratio between butene-1 and ethylene in the reacting liquid phase is at least 20:1.

15. Copolymers of ethylene, an aliphatic monoolefin, and an omega-alkenyl-polycycloalkene according to claim 1, said copolymers containing an amount of polymerized ethylene in the range from about 5% to about 75% by mols, an amount of polymerized omega-alkenyl-polycycloalkene in the range from 0.1% to about 20% by mols, and the balance to 100% of polymerized aliphatic monoolefin.

References Cited

UNITED STATES PATENTS

| | | | |
|---|---|---|---|
| 3,271,372 | 9/1966 | Caywood | 260—80.5 |
| 3,151,173 | 9/1964 | Nyce | 260—666 |
| 3,144,491 | 8/1964 | O'Connor | 260—666 |

JOSEPH L. SCHOFER, Primary Examiner

ROGER S. BENJAMIN, Assistant Examiner

U.S. Cl. X.R.

260—88.2, 666